United States Patent
Avni et al.

(10) Patent No.: US 9,131,374 B1
(45) Date of Patent: Sep. 8, 2015

(54) KNOWLEDGE-BASED AUTHENTICATION FOR RESTRICTING ACCESS TO MOBILE DEVICES

(75) Inventors: Ayelet Avni, Binyamina (IL); Ayelet Levin, Pardes Hanna Karkur (IL); Bryan Knauss, Broadlands, VA (US); Yedidya Dotan, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 435 days.

(21) Appl. No.: 13/434,991

(22) Filed: Mar. 30, 2012

Related U.S. Application Data

(60) Provisional application No. 61/602,701, filed on Feb. 24, 2012.

(51) Int. Cl.
    *H04M 1/66*     (2006.01)
    *H04W 12/06*     (2009.01)
    *H04L 9/32*     (2006.01)

(52) U.S. Cl.
    CPC ............ *H04W 12/06* (2013.01); *H04L 9/3271* (2013.01)

(58) Field of Classification Search
    CPC ..... H04W 12/06; H04L 9/3271; G06Q 20/40; G06F 21/31; H04M 2203/6027
    See application file for complete search history.

(56) References Cited

U.S. PATENT DOCUMENTS

| | | | |
|---|---|---|---|
| 7,698,242 B2 * | 4/2010 | Van Camp et al. | 706/45 |
| 8,412,938 B2 * | 4/2013 | Farrugia et al. | 713/168 |
| 8,499,342 B1 * | 7/2013 | Macwan | 726/7 |
| 2008/0288299 A1 * | 11/2008 | Schultz | 705/4 |
| 2009/0007245 A1 * | 1/2009 | Schultz | 726/5 |
| 2009/0083826 A1 * | 3/2009 | Baribault | 726/1 |
| 2009/0265773 A1 * | 10/2009 | Schultz | 726/7 |
| 2009/0305670 A1 * | 12/2009 | DeBoer et al. | 455/411 |
| 2010/0250955 A1 * | 9/2010 | Trevithick et al. | 713/185 |
| 2012/0072975 A1 * | 3/2012 | Labrador et al. | 726/6 |
| 2012/0180124 A1 * | 7/2012 | Dallas et al. | 726/22 |
| 2012/0214442 A1 * | 8/2012 | Crawford et al. | 455/411 |
| 2012/0216260 A1 * | 8/2012 | Crawford et al. | 726/5 |
| 2013/0160088 A1 * | 6/2013 | McFarland | 726/4 |
| 2013/0227651 A1 * | 8/2013 | Schultz et al. | 726/4 |
| 2013/0269013 A1 * | 10/2013 | Parry et al. | 726/7 |

* cited by examiner

*Primary Examiner* — Fatoumata Traore
*Assistant Examiner* — Khoi Le
(74) *Attorney, Agent, or Firm* — BrainwoodHuang

(57) ABSTRACT

An improved technique employs knowledge-based authentication (KBA) based on data stored in a mobile apparatus. The mobile apparatus collects data from sources including email data, web browsing data, accessed YouTube video data, and GPS location data recently stored in the mobile apparatus. From such data, the mobile apparatus builds questions and stores the questions on a database on the phone. Upon receiving a request to access a resource stored in the mobile apparatus from a user, the mobile apparatus selects questions at random and ranks them according to a policy accessible to the mobile apparatus. The mobile apparatus presents the highest-ranked questions to the user. The mobile apparatus grants or rejects access to the resource based on an authentication result that the mobile apparatus generates from answers to the questions submitted by the user.

23 Claims, 5 Drawing Sheets

60 ↘         80 ↘

| Question Types: | | | | | |
|---|---|---|---|---|---|
| Meetings: | X | All | | Private | | Work |
| Location Data: | | All | | | X | Of Meetings |
| Emails: | | All | | Private | X | Work |
| Browsing History: | X | | | | | |
| Youtube History: | | | | | | |
| App Info: | X | All | | Private | | Work |
| Call info: | | All | X | Private | | Work |

90 ↘

| Question Difficulty |
|---|
| ■ ■ ■ ■ ■ ■ □ |
| Only spouse should answer correctly |

Figure 3

KNOWLEDGE-BASED AUTHENTICATION FOR RESTRICTING ACCESS TO MOBILE DEVICES

CROSS REFERENCE TO RELATED APPLICATIONS

This Patent Application claims the benefit under 35 U.S.C. §119(e) of U.S. Provisional Patent Application No. 61/602,701 filed on Feb. 24, 2012, entitled, "SMART PHONE KNOWLEDGE BASED AUTHENTICATION," the contents and teachings of which are hereby incorporated by reference in their entirety.

BACKGROUND

Mobile devices such as smartphones and tablets store sensitive data. For example, a smartphone may store financial information such as bank account numbers which belong to the owner of the smartphone. As another example, a smartphone may store business secrets within emails and other documents which belong to a corporation for which the owner of the smartphone works.

A conventional mobile device controls access to sensitive data by requiring a password to be entered when the mobile device emerges from a "sleep" or a "power off" state. The owner of the mobile device enters a password known only to the owner into the mobile device, where the password is stored in memory. The password is not erased until the owner changes the password. For a user to change the password, the user must know the password.

In some arrangements, the conventional mobile device allows for a trusted party to access sensitive data in the event that the owner forgets the password. In this case, the owner grants the trusted party the right to change the password through either knowledge of the password or an ability to reset the device.

SUMMARY

Unfortunately, there are deficiencies with the above-described conventional mobile device. For example, passwords are a weak form of authentication in which there is a high likelihood that a fraudulent user will gain access to sensitive data on the mobile device. Further, owners of mobile devices frequently forget their passwords; in order to gain access to their devices, these owners rely on other, potentially untrustworthy, parties to restore their access.

In contrast to conventional mobile devices that rely on weak forms of authentication to control access to sensitive data stored on the mobile devices, an improved technique employs knowledge-based authentication (KBA) based on data stored in a mobile apparatus. The mobile apparatus collects data from sources including email data, web browsing data, accessed YouTube video data, and GPS location data recently stored in the mobile apparatus. From such data, the mobile apparatus builds questions and stores the questions on a database on the phone. Upon receiving a request to access a resource stored in the mobile apparatus from a user, the mobile apparatus selects questions at random and ranks them according to a policy accessible to the mobile apparatus. The mobile apparatus presents the highest-ranked questions to the user. The mobile apparatus grants or rejects access to the resource based on an authentication result that the mobile apparatus generates from answers to the questions submitted by the user.

Advantageously, the improved technique provides a high likelihood that only the owner of a mobile apparatus has access to resources on the mobile apparatus. Because KBA relies on information that exists on the mobile apparatus, the owner does not need to remember a password that he or she might forget. An added and important advantage of not relying on such a password is that there is no reliance on a potentially untrustworthy backup user that may choose to access the resource without authorization to do so.

One embodiment of the improved technique is directed to a method of restricting access to resources stored in a storage device of a mobile apparatus in the mobile apparatus. The method includes generating, by a processor of the mobile apparatus, a set of knowledge-based authentication (KBA) questions based on data stored in the storage device of the mobile apparatus. The method also includes receiving, by the processor via an input device of the mobile apparatus, a request for the user to be granted access to the resources stored in the storage device of the mobile apparatus. The method further includes presenting, by the processor via an output device of the mobile apparatus, questions of the set of KBA questions to the user in response to receiving the request. The method further includes obtaining, by the processor via the input device, answers from the user to the questions. The method further includes performing, by the processor, a KBA operation configured to produce an authentication result from the answers, the user being granted or denied access to the resources based on the authentication result.

Additionally, some embodiments of the improved technique are directed to an apparatus constructed and arranged to restrict access to resources stored in a storage device of a mobile apparatus in the mobile apparatus. The apparatus includes a storage device, an input device, an output device, memory, and a controller including controlling circuitry constructed and arranged to carry out the method of restricting access to resources stored in a storage device of a mobile apparatus in the mobile apparatus.

Furthermore, some embodiments of the improved technique are directed to a computer program product having a non-transitory computer readable storage medium which stores code including a set of instructions to carry the method of restricting access to resources stored in a storage device of a mobile apparatus in the mobile apparatus.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 3 is a block diagram illustrating an example policy within the mobile apparatus shown in FIG. 2.

DETAILED DESCRIPTION

An improved technique employs knowledge-based authentication (KBA) based on data stored in a mobile apparatus. The mobile apparatus collects data from sources including email data, web browsing data, accessed YouTube video data, and GPS location data recently stored in the mobile apparatus. From such data, the mobile apparatus builds questions and stores the questions on a database on the phone. Upon receiving a request to access a resource stored in the mobile apparatus from a user, the mobile apparatus selects questions at random and ranks them according to a policy accessible to the mobile apparatus. The mobile apparatus presents the highest-ranked questions to the user. The mobile apparatus grants or rejects access to the resource based on an authentication result that the mobile apparatus generates from answers to the questions submitted by the user.

Advantageously, the improved technique provides a high likelihood that only the owner of a mobile apparatus has access to resources on the mobile apparatus. Because KBA relies on information that exists on the mobile apparatus, the owner does not need to remember a password that he or she might forget. An added and important advantage of not relying on such a password is that there is no reliance on a potentially untrustworthy backup user that may choose to access the resource without authorization to do so.

Figure 1:
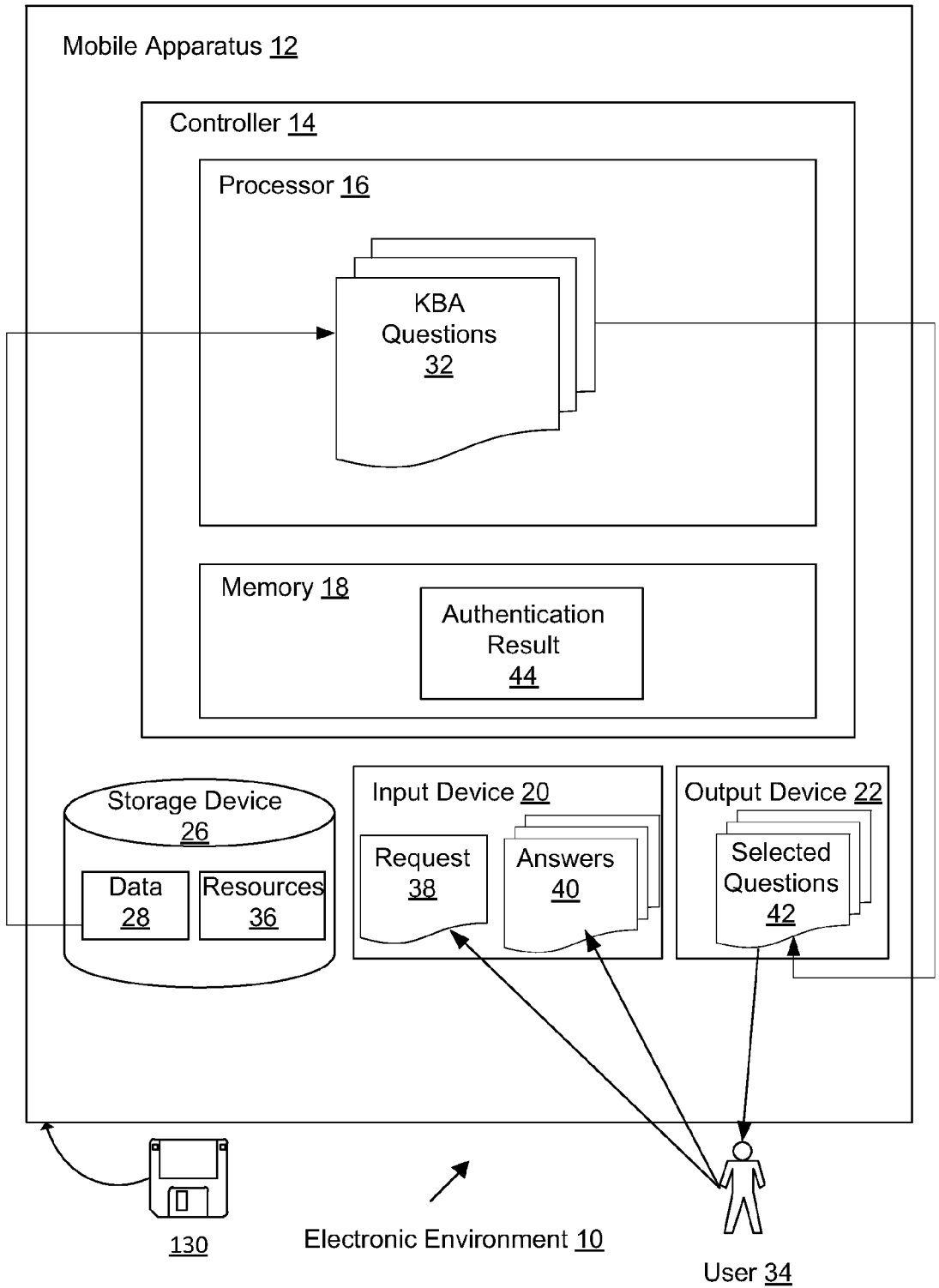
FIG. 1 is a block diagram illustrating an example electronic environment for carrying out the improved technique.

FIG. 1 illustrates an electronic environment 10 for carrying out the improved technique. Electronic environment 10 includes a mobile apparatus 12, which includes controller 14, input device 20, output device 22, and storage device 26.

Controller 14 includes processor 16 and memory 18.

Memory 18 generally takes the form of, e.g., random access memory, flash memory or a non-volatile memory. In some arrangements, when memory 18 includes non-volatile memory, memory 18 serves as the storage device 26 within the mobile apparatus 12.

Processor 16 takes the form of, but is not limited to, ARM or Samsung-based MPUs, and can include a single or multi-cores each running single or multiple threads.

Input device 20 takes the form of a keyboard on which a user 34 provides input to mobile device 12. In some arrangements, input device 20 can take other forms including a microphone and tactile input device.

Output device 22 takes the form of a display device. In some arrangements, output device 22 takes other forms including a speaker and tactile output device.

During operation, user 34 inputs, via input device 20, a request 38 to access resources 36 stored on storage device 26. In some arrangements, request 38 is automatically sent to mobile apparatus 12 upon waking mobile apparatus 12 from a "sleep" state. It should be understood that request 38 takes the form of a single keystroke from a button of a keyboard that is part of input device 30. In some arrangements, however, request 38 takes the form of a voice command when input device 20 includes a microphone.

In response to request 38, processor 16 selects questions 42 from a set of KBA questions 32 to ask user 34. Processor 16 outputs selected questions 42 to output device 22. For example, when output device 22 is a display device, processor 16 formats ASCII characters for rendering text on the display device representing questions 42 for user 34 to read. In some arrangements, however, when output device includes a speaker, processor 16 sends data for questions 42 to speech synthesis circuitry for rendering data for questions 42 as speech for user 42 to hear.

It should be understood that processor 16 generates KBA questions 32 from data 28 stored on storage device 26. Data 28 includes including email data, web browsing data, accessed YouTube video data, and GPS location data. Details about the generation of KBA questions from data 28 are described with respect to FIG. 2 below.

User 34, upon being presented with selected questions 42, provides answers 40 to the questions 42 via input device 20. When input device 20 is a keyboard, user 34 provides answers 40 by typing into the keyboard. In some arrangements, however, when input device includes a microphone, answers 40 take the form of sound files that speech synthesis circuitry of processor 16 translates into text.

Processor 16 then performs a KBA operation on the answers. The KBA operation generates an authentication result 44 in memory 18 based on answers 40. For example, when there are six questions in selected questions 42 and user 34 supplies more than four correct answers, then authentication result 44 represents a 99% probability that user 34 is the owner of mobile apparatus 12.

Figure 2:
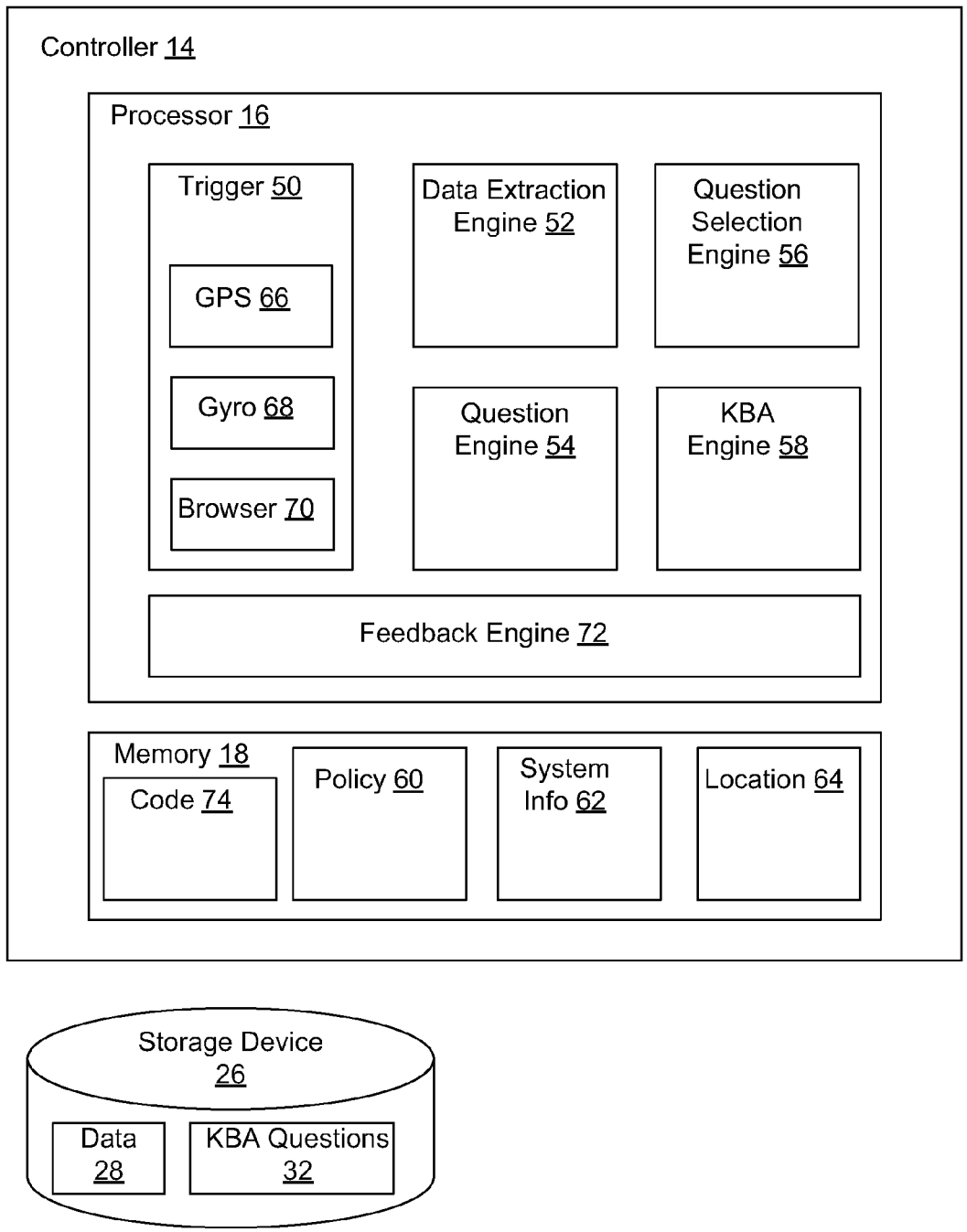
FIG. 2 is a block diagram illustrating an example mobile apparatus within the electronic environment shown in FIG. 1.

FIG. 2 illustrates further details of processor 16, memory 18, and storage device 26.

Processor 16 further includes trigger 50, data extraction engine 52, question engine 54 for building questions from data 28 extracted by data extraction engine 52 for accessing data 28 from storage device 26 and storing it in a location in memory 18, question selection engine 56 for filtering out questions that conflict with policy 60, KBA engine 58 for generating an authentication result 44 (see FIG. 1), and feedback engine 72.

Trigger 50 includes triggers that alert processor 16 to begin to capture data 28. Trigger 50 includes a GPS trigger 66, a gyroscopic trigger 68, and a web browser trigger 70. In some arrangements, there are other triggers, e.g. a YouTube trigger.

Memory 18 stores policy data 60, system information 62 which includes data defining time zone, operating system, owner's personal information, etc., location data 64 which includes historical data of locations, and code 74 for the various engines and triggers in processor 16.

Policy 60 includes data defining preferences concerning the content and difficulty level for questions that processor 16 sends to user 34. Policy 60 further includes code for generating policy data. In some arrangements, the owner of mobile apparatus 12 generates policy data directly on mobile apparatus 12 via input device 20 (see FIG. 1).

During operation, one of the various triggers 50 creates an event for collecting data. Along these lines, suppose that the owner of the phone is in a particular location (e.g., office building, retail store, etc.). GPS trigger 66 then stores the resulting location data 64 in memory 18. In another example, gyroscopic trigger 68 senses when the owner engages in continuous motion (e.g., walking, jogging, etc.) and stores the resulting path data as data 28. In yet another example, web browser trigger 70 stores web browsing data in as data 28.

At certain times (e.g., regular intervals), data extraction engine 52 extracts data 28 from storage device 26 and places it in memory 18. Upon the execution of such a data extraction operation by data extraction engine 52, question engine 54 builds KBA questions 32 (see FIG. 1) from data 28. In some arrangements, question engine 54 stores KBA questions 32 in storage device 26.

It should be understood that there is a finite amount of storage space in storage device 26. In some arrangements, then, each KBA question 32 includes a value of a Time-To-Live (TTL) parameter which indicates the length of time the KBA question 32 is stored in storage device 26 before being removed by processor 16. A benefit of this TTL parameter is that the KBA questions 32 do not get so old that the owner of mobile apparatus 12 would have trouble answering that KBA question 32.

Upon receiving request 38 (see FIG. 1) from user 34, question selection engine 56 selects KBA questions 32 at random and stores these questions in memory 18. In some arrangements, however, question selection engine 56 selects KBA questions 32 using a deterministic process, e.g., the 12 oldest questions. Question selection engine 56 then performs a question ranking operation in which question selection engine 56 applies a set of rules dictated by policy 60 to the questions in memory 18. Further details of generating policy data will be shown with respect to FIG. 3 below.

In some arrangements, an output of the question ranking policy is a ranking value for each question, by which question selection engine 56 ranks these questions. Question selection engine 56 selects the top-ranked (i.e., highest ranking value) four or six questions as the selected questions 42.

Processor 16 sends selected questions to output device 22 (see FIG. 1), whereupon user 34 inputs answers 40 to selected questions 32 via input device 20 (see FIG. 1) into memory 18.

KBA engine 58 extracts answers 40 to selected questions 32 and generates authentication result 44 representing the likelihood that user 32 is the owner of mobile apparatus 12 based on answers 40. Based on the likelihood, processor 16 makes a decision to grant or deny access to resources 36 (see FIG. 1).

In some arrangements, processor 16 sends questions 32, answers 40, and authentication result 44 to feedback engine 72. In addition, processor 16 sends feedback data indicating that user 34 is either the owner of mobile apparatus 12 or a fraudulent user to feedback engine 72. Based on the feedback data, feedback engine 72 updates policy 60 to reflect the categories of questions that result in questions 32 that better predict when user 34 is the owner of mobile apparatus 12.

FIG. 3 illustrates details of an example policy 60. The example policy 60 appears as it would when displayed on a display device. Policy 60 includes example policy data table 80 and example policy difficulty meter 90.

Policy data table 80 includes entries corresponding to permissions regarding categories of KBA questions 32 (see FIG. 2) allowed to be sent to user 34 (See FIG. 1). The categories of KBA questions in policy data table 80 include meetings, location data, emails, browsing history, YouTube history, app data, and phone call data. Data 28 (see FIG. 2) is, in some arrangements, tagged with appropriate keywords (e.g., "work") for applying permissions.

The meetings and email categories include a filter for choosing whether only those meetings that are marked "Work" or "Private." For example, the owner may not wish to expose sensitive information about his or her company's meetings; in this case, the owner would put an "X" in the "Private" option.

The Location Data category differentiates between simply locations of meetings (i.e., for business) or other locations.

App Info and Call Info categories also include a filter for choosing whether only those meetings that are marked "Work" or "Private."

Further, browsing history and YouTube history can be included or excluded with a single checkbox.

Policy difficulty meter 90 represents a measure of how difficult the questions 32 (see FIG. 1) should be. For example, the owner of mobile apparatus 12 sets policy difficulty meter 90 to a difficult level (e.g., six out of seven) in order to ensure that, in all likelihood, only a spouse could guess enough correct answers 40 (see FIG. 1) to be granted access to resources 26 (see FIG. 1). Question selection engine 56 selects KBA questions satisfying a particular difficulty level based on factors including age of facts in question, references to other users (e.g., coworkers, relatives, etc.), and question category (e.g., asking a definition from a Wikipedia website visit).

It should be understood that, in the examples above, policy 60 was created locally by the owner of mobile apparatus 12. In some arrangements, however, policy 60 is created via a remote server. Further details about such a remote policy are shown with respect to FIG. 4 below.

Figure 4:
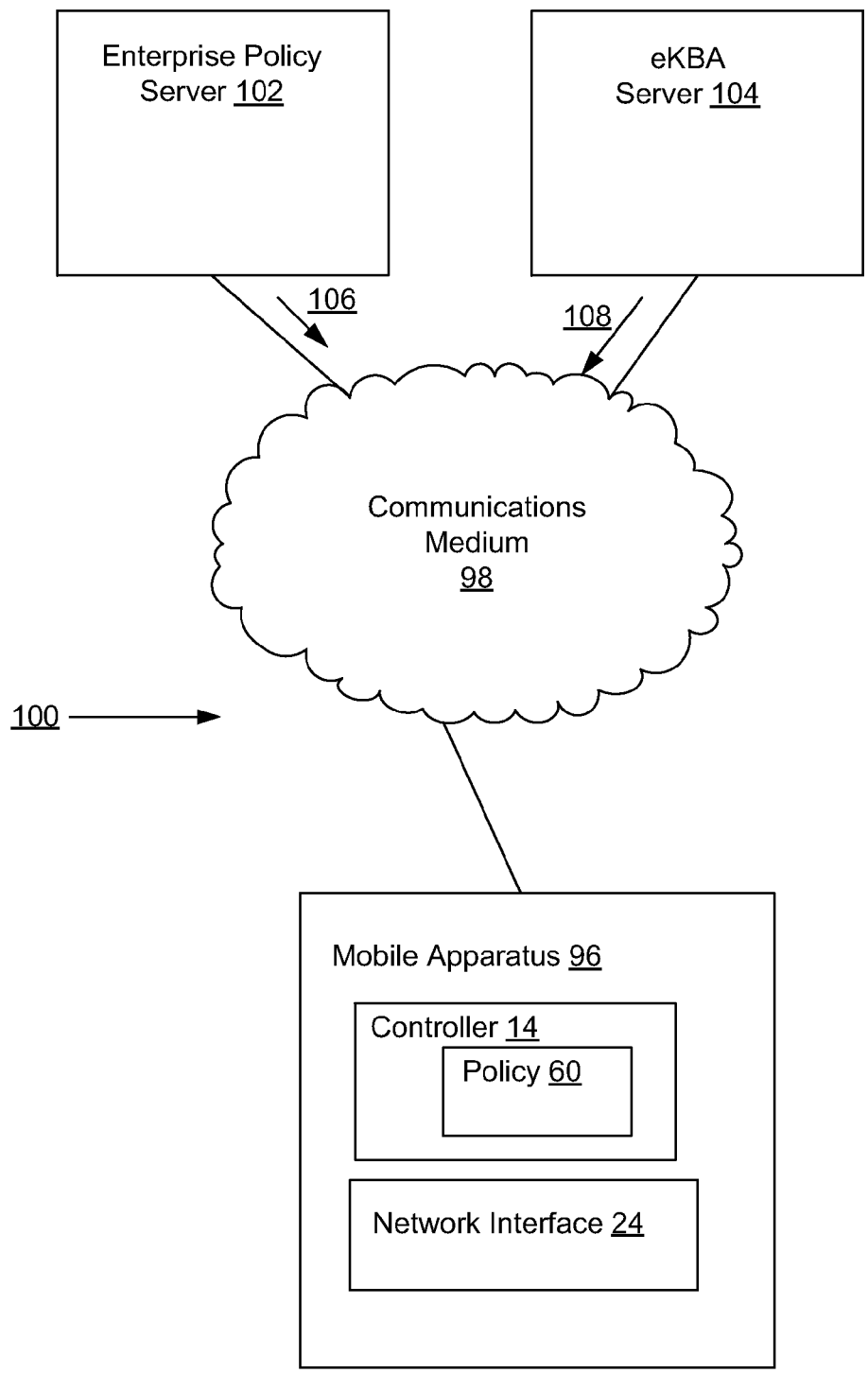
FIG. 4 is a block diagram illustrating an example environment for generating the policy shown in FIG. 3.

FIG. 4 illustrates an environment 100 for carrying out the improved technique. Environment 100 includes mobile apparatus 12, communications medium 22, enterprise policy server 102, and eKBA server 104.

Mobile apparatus 96 includes, in addition to the features described with respect to mobile apparatus 12 in FIGS. 1 and 2 above, a network interface 24. Network interface 24 takes the form of a wireless receiver; in some arrangements, network interface 58 takes other forms including an Ethernet card.

Communication medium 98 provides network connections between mobile apparatus 96, enterprise policy server 102, and eKBA server 104. Communications medium 98 may implement a variety of protocols such as TCP/IP, UDP, ATM, Ethernet, Fibre Channel, combinations thereof, and the like. Furthermore, communications media 22 may include various components (e.g., cables, switches/routers, gateways/bridges, NAS/SAN appliances/nodes, interfaces, etc.). Moreover, the communications medium 98 is capable of having a variety of topologies (e.g., queue manager-and-spoke, ring, backbone, multi drop, point to-point, irregular, combinations thereof, and so on).

Enterprise policy server 102 is a server at a remote site (e.g., a company server) on which another party (e.g., a company administrator) inputs policy data in addition to, or instead of, data in policy 60 via policy updates 106.

eKBA server 104 is a server on which data for questions is stored. In some arrangements, all the data for question-building is stored on eKBA server 104.

During operation, enterprise policy server 102 sends policy updates 106 to mobile apparatus 96 via communications medium 98. Policy updates 106 include policy data representative of a company's specific policies. For example, a company may wish to protect particular resources 36 (see FIG. 1) even when user 34 (see FIG. 1) has been granted access to other resources stored in mobile apparatus 96.

In addition, eKBA server 104 sends eKBA data 108 to mobile apparatus 96 via communications medium 98. eKBA data 108 is representative of the company's real-time data and includes, for example, organizational chart data, calendar data for coworkers, expense report data, and human resources data. Policy updates 106 include rules based on eKBA data.

Mobile apparatus 96 receives policy updates 106 and eKBA data 108 over network interface 24. When mobile apparatus 96 receives a request 40 (see FIG. 1) from user 34 to access resources 36, question selection engine 56 selects questions 42 based on the received policy 106 and data 108.

Figure 5:
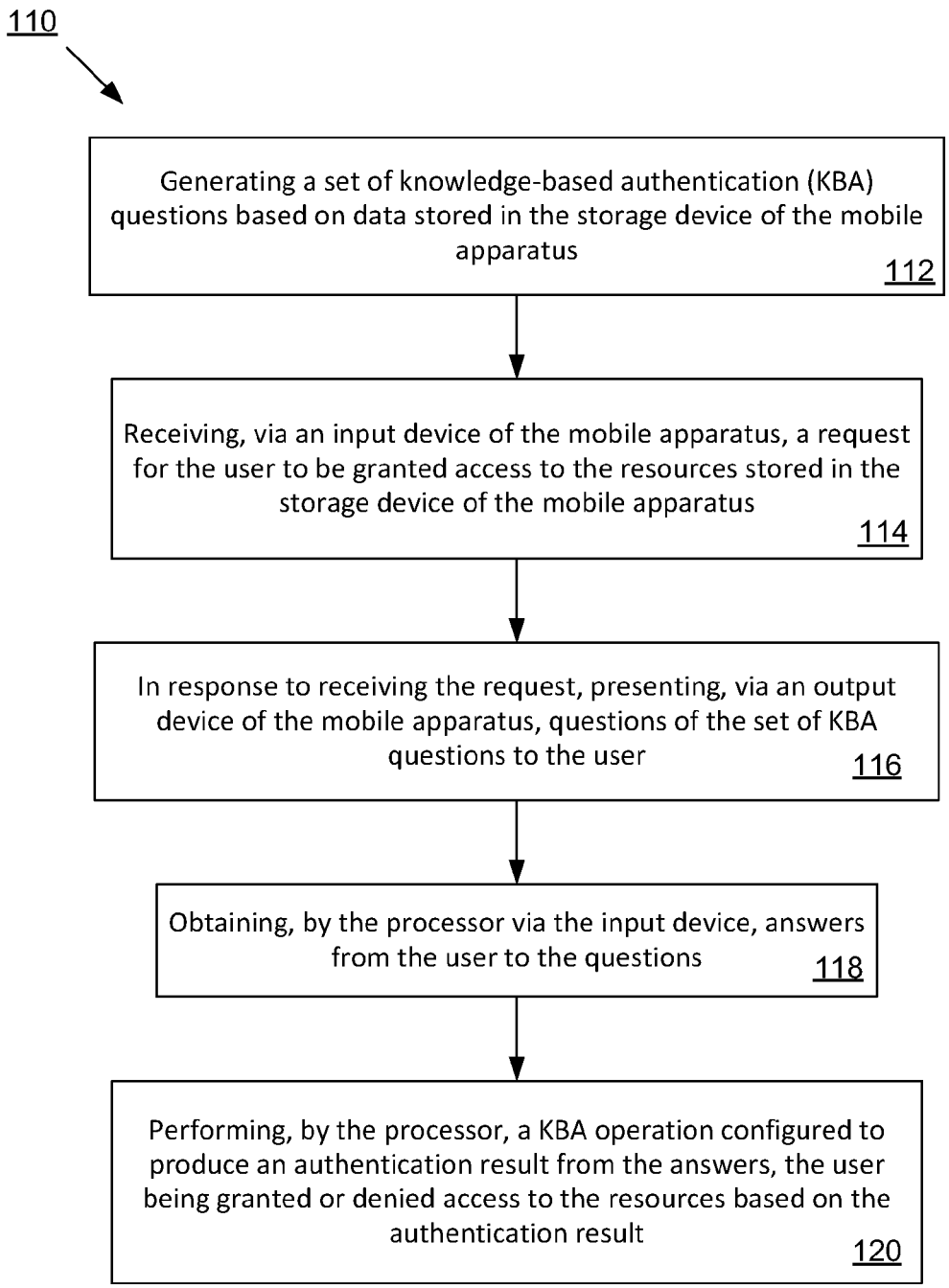
FIG. 5 is a flow chart illustrating a method of carrying out the improved technique within the electronic environment shown in FIG. 1.

FIG. 5 illustrates a method 110 of restricting access to resources stored in a storage device of the mobile apparatus in the mobile apparatus. In step 112, a set of KBA questions are generated based on data stored in the storage device of the mobile apparatus. In step 114, a request for the user to be granted access to the resources stored in the storage device of the mobile apparatus is received via an input device of the mobile apparatus. In step 116, questions of the set of KBA questions are presented to the user via an output device of the mobile apparatus in response to receiving the request. In step 118, answers from the user to the questions are obtained via the input device. In step 120, a KBA operation configured to produce an authentication result from the answers is performed, the user being granted or denied access to the resources based on the authentication result.

While various embodiments of the invention have been particularly shown and described, it will be understood by those skilled in the art that various changes in form and details may be made therein without departing from the spirit and scope of the invention as defined by the appended claims.

For example, in some arrangements, policy difficulty meter 90 is automatically set based on settings in policy data table 80.

Furthermore, it should be understood that some embodiments are directed to mobile apparatus 12 which is constructed and arranged to provide a set of questions. Some embodiments are directed to a process of restricting access to resources stored in a storage device of the mobile apparatus in the mobile apparatus. Also, some embodiments are directed to a computer program product which enables computer logic to restrict access to resources stored in a storage device of the mobile apparatus in the mobile apparatus.

In some arrangements, mobile apparatus 12 is implemented by a set of processors or other types of control/processing circuitry running software. In such arrangements, the software instructions can be delivered within mobile apparatus 12 in the form of a computer program product 130 (see FIG. 1), each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. In a mobile apparatus, a method of restricting access to resources stored in a storage device of the mobile apparatus, comprising:
generating, by a processor of the mobile apparatus, a set of knowledge-based authentication (KBA) questions based on data stored in the storage device of the mobile apparatus;
receiving, by the processor via an input device of the mobile apparatus, a request for a user to be granted access to the resources stored in the storage device of the mobile apparatus;
in response to receiving the request, presenting, by the processor via an output device of the mobile apparatus, questions of the set of KBA questions to the user;
obtaining, by the processor via the input device, answers from the user to the questions; and
performing, by the processor, a KBA operation configured to produce an authentication result from the answers, the user being granted or denied access to the resources based on the authentication result;
wherein generating the set of KBA questions includes, for each of the set of KBA questions, store a timestamp corresponding to the time at which that KBA question was generated;
wherein presenting the questions of the set of KBA questions to the user includes selecting the questions according to differences between the time at which the request was received and the timestamps corresponding to the times at which the KBA questions of the set of KBA questions were generated; and
wherein a fixed number of questions is selected.

2. The method according to claim 1,
wherein the set of KBA questions is stored in the storage device of the mobile apparatus;
wherein each KBA question of the set of KBA questions includes a value of a Time-To-Live (TTL) parameter;
wherein the method further comprises:
removing a KBA question from the storage device when a value of the time elapsed since the KBA question was generated exceeds the value of the TTL parameter of the KBA question.

3. The method according to claim 2,
wherein presenting the questions of the set of KBA questions to the user includes:
storing, in a location in memory of the mobile apparatus, selected questions of the KBA apparatus, the selected questions being selected from the set of KBA questions according to a policy accessible to the mobile apparatus; and
sending the selected questions to the user.

4. The method according to claim 3,
wherein the policy includes rules configured to control i) permissions regarding categories of KBA questions allowed to be sent to the user, and ii) a level of difficulty associated with the KBA questions sent to the user, the rules being generated by the processor of the mobile apparatus, and
wherein presenting the questions of the set of KBA questions to the user further includes:
applying the policy to the set of KBA questions to produce the selected questions.

5. The method according to claim 4,
wherein the policy further includes additional rules configured to control permissions regarding additional categories of KBA questions allowed to be sent to the user, the additional rules being generated by an electronic computing system remote from the mobile apparatus, and
wherein presenting the questions of the set of KBA questions to the user further includes:
receiving information associated with the additional rules via a network interface of the mobile apparatus.

6. The method according to claim 3,
wherein the mobile apparatus further includes a trigger configured to create events in the mobile apparatus,
wherein the data stored in the storage device of the mobile apparatus includes event data produced upon an occurrence of an event created by the trigger, and
where the method further comprises:
collecting event data upon the occurrence of the event.

7. The method according to claim 6,
wherein the trigger includes a global positioning system (GPS) device,
wherein the event is location data derived from the GPS device corresponding to a particular location, and
wherein collecting the event data upon the occurrence of the event includes:
receiving, as the event data, mobile apparatus location data derived from the GPS device.

8. The method according to claim 7,
wherein the trigger further includes a gyroscopic device,
wherein the event is a speed associated with motion of the mobile apparatus detected by the gyroscope exceeding a threshold speed, and
wherein collecting the event data upon the occurrence of the event further includes:
receiving, as the event data, mobile apparatus path data derived from the GPS device and the gyroscopic device.

9. The method according to claim 6,
wherein the trigger includes a web browser,
wherein the event is the web browser accessing a particular website, and wherein collecting the event data upon the occurrence of the event includes:
receiving, as the event data, facts derived from the particular website.

10. The method according to claim 3, further comprising:
performing a feedback operation on the answers to the selected questions, output of the feedback operation forming input data on which the policy is based.

11. The method according to claim 1, further comprising, for each of the set of KBA questions, storing a ranking value in the storage device of the mobile apparatus corresponding to that KBA question, the ranking value corresponding to a KBA question indicating a likelihood that (i) the user is an authorized user of the mobile device given that the user provided a correct answer to the KBA question and (ii) the user is not an authorized user of the mobile device given that the user provided an incorrect answer to the KBA question; and
wherein presenting the questions of the set of KBA questions to the user includes selecting the fixed number of KBA questions of the set of KBA questions for presentation to the user, the ranking values corresponding to the fixed number of KBA questions being greater than or equal to the ranking values corresponding to other KBA questions of the set of KBA questions.

12. The method according to claim 11, wherein the data stored in the storage device of the mobile apparatus includes public data and private data, the public data representing information that may be exposed to the user prior to granting the user access to the resources, the private data representing information that is not to be exposed to the user prior to granting the user access to the resources, and
wherein storing the ranking value in the storage device of the mobile apparatus corresponding to each of the set of KBA questions includes:
storing a first ranking value corresponding to a KBA question of the set of KBA questions that was generated based on public data only, and
storing a second ranking value corresponding to a KBA question of the set of KBA questions that was generated based on private data, the second ranking value being less than the first ranking value.

13. A mobile apparatus, comprising:
a storage device;
an input device;
an output device;
memory; and
a controller including controlling circuitry coupled to the memory, the controlling circuitry being constructed and arranged to:
generate a set of knowledge-based authentication (KBA) questions based on data stored in the storage device of the mobile apparatus;
receive, via the input device, a request for a user to be granted access to the resources stored in the storage device of the mobile apparatus;
in response to receiving the request, present, via the output device, questions of the set of KBA questions to the user;
obtain, via the input device, answers from the user to the questions; and
perform a KBA operation configured to produce an authentication result from the answers, the user being granted or denied access to the resources based on the authentication result;
wherein the controlling circuitry constructed and arranged to generate the set of KBA questions is further constructed and arranged to, for each of the set of KBA questions, store a timestamp corresponding to the time at which that KBA question was generated;
wherein the controlling circuitry constructed and arranged to present the questions of the set of KBA questions to the user is further constructed and arranged to select the questions according to differences between the time at which the request was received and the timestamps corresponding to the times at which the KBA questions of the set of KBA questions were generated; and
wherein a fixed number of questions is selected.

14. The mobile apparatus according to claim 13,
wherein the set of KBA questions is stored in the storage device of the mobile apparatus;
wherein each KBA question of the set of KBA questions includes a value of a Time-To-Live (TTL) parameter;
wherein the controlling circuitry is further constructed and arranged to:
remove a KBA question from the storage device when a value of the time elapsed since the KBA question was generated exceeds the value of the TTL parameter of the KBA question.

15. The mobile apparatus according to claim 14,
wherein the controlling circuitry constructed and arranged to present the questions of the set of KBA questions to the user is further constructed and arranged to:
store, in a location in memory of the mobile apparatus, selected questions of the KBA apparatus, the selected questions being selected from the set of KBA questions according to a policy accessible to the mobile apparatus; and
send the selected questions to the user.

16. The mobile apparatus according to claim 15,
wherein the policy includes rules configured to control i) permissions regarding categories of KBA questions allowed to be sent to the user, and ii) a level of difficulty associated with the KBA questions sent to the user, the rules being generated by the processor of the mobile apparatus, and
wherein the controlling circuitry constructed and arranged to present the questions of the set of KBA questions to the user is further constructed and arranged to:
apply the policy to the set of KBA questions to produce the selected questions.

17. The mobile apparatus according to claim 16,
wherein the mobile apparatus further comprises:
a network interface,
wherein the policy further includes additional rules configured to control permissions regarding additional categories of KBA questions allowed to be sent to the user, the additional rules being generated by an electronic computing system remote from the mobile apparatus, and
wherein the controlling circuitry constructed and arranged to present the questions of the set of KBA questions to the user is further constructed and arranged to:
receive information associated with the additional rules.

18. The mobile apparatus according to claim 15,
wherein the mobile apparatus further includes a trigger configured to create events in the mobile apparatus,
wherein the data stored in the storage device of the mobile apparatus includes event data produced upon an occurrence of an event created by the trigger, and
where the controlling circuitry is further constructed and arranged to:
collect event data upon the occurrence of the event.

19. The mobile apparatus according to claim 18,
wherein the trigger includes a global positioning system (GPS) device,
wherein the event is location data derived from the GPS device corresponding to a particular location, and
wherein the controlling circuitry constructed and arranged to collect the event data upon the occurrence of the event is further constructed and arranged to:
receive, as the event data, mobile apparatus location data derived from the GPS device.

20. The mobile apparatus according to claim 19,
wherein the trigger further includes a gyroscopic device,
wherein the event is a speed associated with motion of the mobile apparatus detected by the gyroscope exceeding a threshold speed, and
wherein the controlling circuitry constructed and arranged to collect the event data upon the occurrence of the event is further constructed and arranged to:
receive, as the event data, mobile apparatus path data derived from the GPS device and the gyroscopic device.

21. The mobile apparatus according to claim 18,
wherein the trigger includes a web browser,
wherein the event is the web browser accessing a particular website, and
wherein the controlling circuitry constructed and arranged to collect the event data upon the occurrence of the event is further constructed and arranged to:
receive, as the event data, facts derived from the particular website.

22. In a mobile apparatus, a computer program product having a non-transitory, computer-readable storage medium which stores code to restrict access to resources stored in a storage device of the mobile apparatus, the code including instructions to:
generate a set of knowledge-based authentication (KBA) questions based on data stored in the storage device of the mobile apparatus;
receive, via an input device of the mobile apparatus, a request for a user to be granted access to the resources stored in the storage device of the mobile apparatus;
in response to receiving the request, present, via an output device of the mobile apparatus, questions of the set of KBA questions to the user;
obtain, via the input device, answers from the user to the questions; and
perform a KBA operation configured to produce an authentication result from the answers, the user being granted or denied access to the resources based on the authentication result;
wherein generating the set of KBA questions includes, for each of the set of KBA questions, store a timestamp corresponding to the time at which that KBA question was generated; and
wherein presenting the questions of the set of KBA questions to the user includes selecting the questions according to differences between the time at which the request was received and the timestamps corresponding to the times at which the KBA questions of the set of KBA questions were generated; and
wherein a fixed number of questions is selected.

23. In a mobile apparatus, a method of restricting access to a resource stored in a storage device of the mobile apparatus, comprising:
generating, by a processor of the mobile apparatus, a set of knowledge-based authentication (KBA) questions based on data stored in the storage device of the mobile apparatus;
receiving, by the processor, a request for a user to be granted access to the resource;
in response to receiving the request, presenting, by the processor, a question of the set of KBA questions to the user;
obtaining, by the processor, an answer from the user to the question; and
performing, by the processor, a KBA operation configured to produce an authentication result from the answer, the authentication result indicating whether the user is an authorized user of the mobile device;
wherein generating the set of KBA questions includes storing a timestamp corresponding to a time at which a KBA question of the set of KBA questions was generated; and
wherein presenting the question to the user includes selecting the KBA question according to a difference between (i) a time at which the request was received and (ii) the time at which the KBA question was generated;
wherein a single question is selected.

\* \* \* \* \*